(12) United States Patent
Koeckritz et al.

(10) Patent No.: US 9,957,666 B2
(45) Date of Patent: May 1, 2018

(54) CLOTHING AND METHOD FOR THE PRODUCTION THEREOF

(71) Applicant: VOITH PATENT GMBH, Heidenheim (DE)

(72) Inventors: Uwe Koeckritz, Heidenheim (DE); Hubert Walkenhaus, Kerpen (DE); Johan Einarsson, Ulm (DE); Johan Malmquist, Katrineholm (SE)

(73) Assignee: Voith Patent GmbH, Heidenheim (DE)

( * ) Notice: Subject to any disclaimer, the term of this patent is extended or adjusted under 35 U.S.C. 154(b) by 142 days.

(21) Appl. No.: 14/900,219

(22) PCT Filed: May 12, 2014

(86) PCT No.: PCT/EP2014/059605
§ 371 (c)(1),
(2) Date: Dec. 21, 2015

(87) PCT Pub. No.: WO2014/202281
PCT Pub. Date: Dec. 24, 2014

(65) Prior Publication Data
US 2016/0153140 A1    Jun. 2, 2016

(30) Foreign Application Priority Data

Jun. 21, 2013   (DE) .......................... 10 2013 211 786

(51) Int. Cl.
*D21F 7/08* (2006.01)
*D21F 7/10* (2006.01)
(Continued)

(52) U.S. Cl.
CPC ............... *D21F 7/083* (2013.01); *B32B 5/06* (2013.01); *D04H 1/46* (2013.01); *D04H 1/5405* (2013.01);
(Continued)

(58) Field of Classification Search
CPC .... D21F 1/0027; D21F 1/0036; D21F 1/0063; D21F 1/0072; D21F 1/0081; D21F 1/10;
(Continued)

(56) References Cited

U.S. PATENT DOCUMENTS 4,781,967 A * 11/1988 Legge ....................... B32B 5/12
162/900
4,842,905 A    6/1989 Stech
(Continued)

FOREIGN PATENT DOCUMENTS

| DE | 102008000915 A1 | 10/2009 |
|---|---|---|
| DE | 102011007291 A1 | 10/2012 |
| EP | 1209283 A1 | 5/2002 |
| EP | 2128335 A1 | 12/2009 |

*Primary Examiner* — Eric Hug
(74) *Attorney, Agent, or Firm* — Laurence A. Greenberg; Werner H. Stemer; Ralph E. Locher

(57) ABSTRACT

A clothing, in particular for use in a press section of a machine for manufacturing a fibrous web, such as a paper, cardboard, or tissue web, includes a base structure and at least one staple-fiber layer which is disposed on the base structure and is connected thereto. The clothing is assembled from a plurality of strips which are provided in the form of planar formations having a proportion of the base structure and a proportion of the at least one staple-fiber layer. Two mutually opposite edges of the strips have seam loops which are each connected to seam loops of the edges of adjacent strips. The edges having the seam loops are oriented in a cross-machine direction of the clothing. A method for manufacturing a clothing is also provided.

17 Claims, 2 Drawing Sheets

(51) Int. Cl.
*B32B 5/06* (2006.01)
*B32B 5/24* (2006.01)
*B32B 7/06* (2006.01)
*D04H 1/46* (2012.01)
*D04H 1/54* (2012.01)
*B32B 7/08* (2006.01)
*D21F 1/00* (2006.01)

(52) U.S. Cl.
CPC .............. *D21F 7/10* (2013.01); *B32B 5/24* (2013.01); *B32B 7/08* (2013.01); *D21F 1/0036* (2013.01); *D21F 1/0081* (2013.01)

(58) Field of Classification Search
CPC ... D21F 7/08; D21F 7/083; D21F 7/10; D21F 7/12; B32B 5/06; B32B 5/12; B32B 5/24; B32B 5/26; B32B 7/04; B32B 7/08
USPC ......... 162/358.1, 358.2, 900, 902, 903, 904; 28/110, 142
See application file for complete search history.

(56) References Cited

U.S. PATENT DOCUMENTS

| | | | | |
|---|---|---|---|---|
| 4,878,278 | A * | 11/1989 | Hsu | D04H 1/498 |
| | | | | 28/110 |
| 5,202,170 | A * | 4/1993 | Hsu | D21F 7/083 |
| | | | | 162/358.2 |
| 5,268,076 | A * | 12/1993 | Best | D04H 18/02 |
| | | | | 139/383 A |
| 5,360,656 | A * | 11/1994 | Rexfelt | D06H 5/005 |
| | | | | 139/383 A |
| 6,565,713 | B2 * | 5/2003 | Hansen | D21F 7/083 |
| | | | | 156/184 |
| 6,723,208 | B1 * | 4/2004 | Hansen | D21F 1/0036 |
| | | | | 139/383 A |
| 6,811,849 | B2 | 11/2004 | Best | |
| 8,123,911 | B2 | 2/2012 | Koeckritz et al. | |
| 2009/0139600 | A1 * | 6/2009 | Best | D21F 7/083 |
| | | | | 139/383 AA |
| 2009/0293245 | A1 | 12/2009 | Kockritz | |

* cited by examiner

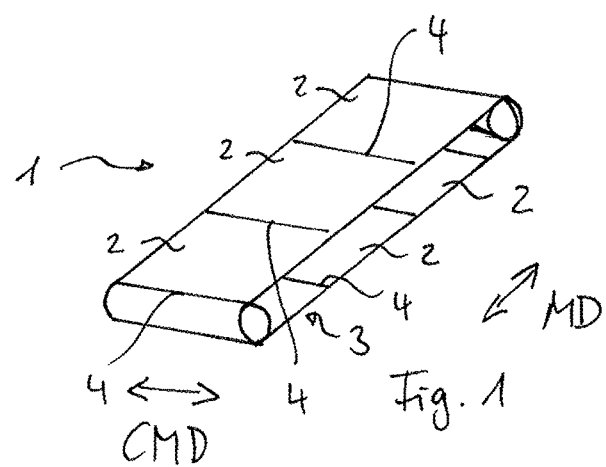
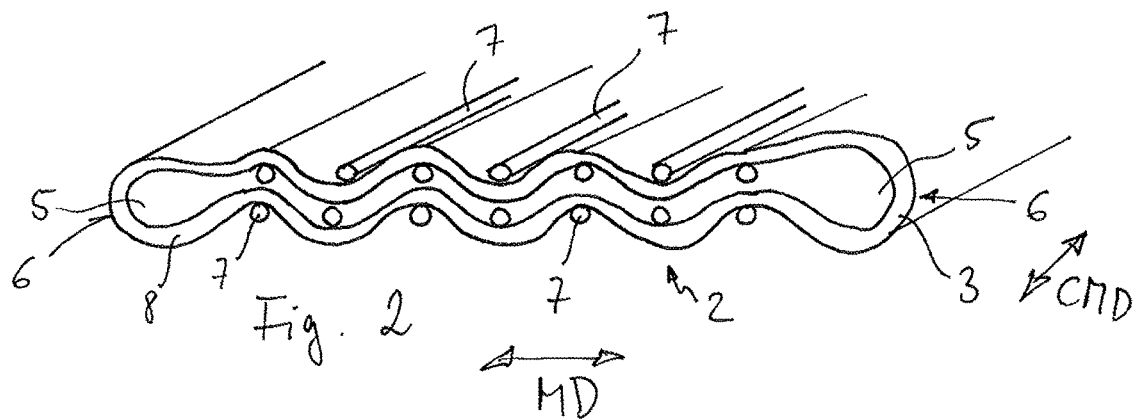

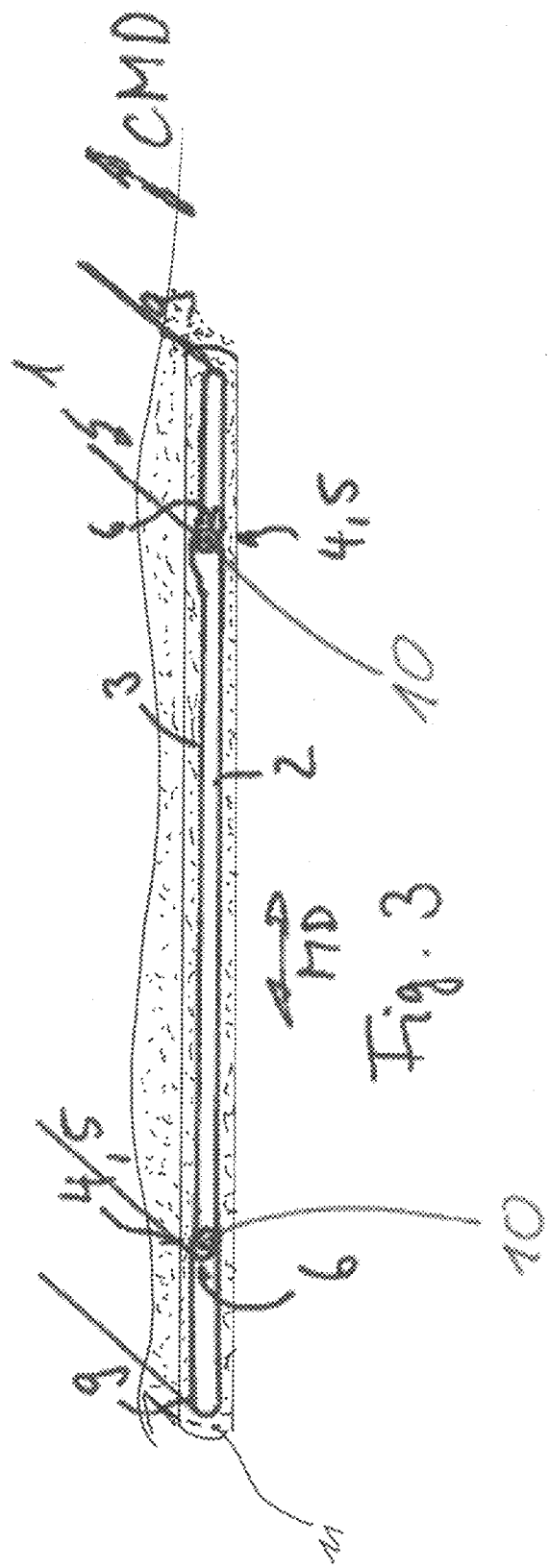

CLOTHING AND METHOD FOR THE PRODUCTION THEREOF

BACKGROUND OF THE INVENTION

Field of the Invention

The invention relates to a clothing, in particular for use in the press section of a machine for manufacturing a fibrous web, such as a paper, cardboard, or tissue web, including a base structure and at least one staple-fiber layer which is disposed on the base structure and is connected thereto, and to a method for manufacturing a clothing of this type.

Clothings in a multiplicity of shapes are to be found in a paper-making machine. Depending on their position, the clothings are assigned different tasks which, apart from supporting and guiding the paper web, in particular serve dewatering. The water which is present in the paper web and which in terms of quantity decreases as the paper web passes through the machine, has to be conveyed away in a suitable manner, without the paper web being damaged thereby or being subjected to marks by mechanical or hydraulic procedures during dewatering.

Gentle dewatering is of primary importance in particular in the press section, since the path toward smoothing of the paper web is already set here. After initial dewatering in the forming section, the paper web is not yet sufficiently dry so as to freely run through the machine, but depending on the scenario is usually guided and pressed on at least one or between two felts.

Accordingly, the requirements to be met by corresponding press felts in terms of the quality of the surface, of water absorption and water release capabilities, and in terms of permeability to air and water are very high.

Established press felts typically have a load-bearing base structure, one or a plurality of additional layers for reinforcing or improving the abovementioned properties, and one or a plurality of layers of staple fibers. The latter represent a bottleneck in production, since the staple-fiber layers may be numerous, on the one hand, and are subject to a multistage and in parts labor-intensive manufacturing process before they are connected to the base structure, on the other hand. This connection is performed by needling in which a needle matrix impinges on the staple-fiber layer which bears on the base structure and pulls the individual fibers into the base structure and therethrough and, on account thereof, enables a fixed connection between the base structure and the staple-fiber layers.

Modern machines for making paper or cardboard often have a large working width which may be up to 11 m. It is thus obvious that the clothings have to have a like width. However, manufacturing clothings in these dimensions is becoming ever more complex and more expensive. Apart from the width of the weaving machines, the width of the needling machines and thus the high investment costs are factors limiting production.

It is thus in the interest of the paper-machine operators and of the clothing industry to seek solutions for manufacturing clothings in a simpler and more cost-effective manner yet in any dimension.

Various attempts to this end have already been undertaken some time ago.

For example, it is known from DE102011007291A1 and from DE102008000915A1 to apply a reinforcement layer of a warp-knitted fabric or another non-woven planar textile in a cross-machine direction to a base structure and to piece together the individual pieces until the complete length of the base structure has been covered. The latter, however, here is configured in the usual manner in the full length and width of the clothing.

It is in particular disadvantageous here that the reinforcement layer cannot be used on its own but only in conjunction with a base structure, since the former does not offer sufficient stability. Moreover, the yarns are not crimped or are undulated, so that there is a risk of the structure being dissolved during use of the clothing.

A clothing which when viewed in the cross direction has a plurality of part-webs which in the longitudinal direction extend parallel with one another and are disposed beside one another, and the lateral peripheries of which are connected by way of connection means is known from EP1209283B1. Adjacent lateral peripheries here have a meandering profile with alternating protrusions and clearances. The part-webs are intermeshed by way of the protrusions and clearances.

In particular the length of the connection regions which, on account of the helical winding of the part-webs, extends across a multiple of the length of the paper-machine clothing, is to be seen as disadvantageous in this prior art. Manufacturing of such a felt is highly complex, both in relation to the factor of time as well as in relation to handling. Moreover, in the case of seam regions extending in the longitudinal machine direction there is always the risk that said seam regions under load expand in a variable manner and the felt is thus damaged, which may result in a higher tendency toward marking as well as in malfunctions right up to felt ruptures, posing a risk to the operating personnel and damaging downstream machine parts.

Furthermore, a paper-machine clothing which is manufactured from individual panels which have jigsaw-puzzle like protrusions and clearances and may be joined together is known from U.S. Pat. No. 4,842,905. The panels here may be extruded, punched, laminated, or manufactured by similarly suitable methods.

The complex manufacturing which requires many steps is disadvantageous in this prior art. Furthermore, the durability of the connections is questionable when only a small protrusion is available on a long edge. In turn, a plurality of protrusions are associated with increased manufacturing complexity of the individual panels. In general, it is difficult to manufacture a seam which operates without marking and with sufficient stability. The construction of the clothing previously mentioned has seams or connections, respectively, in a plurality of directions, i.e. the machine direction and the cross-machine direction, which further increase the tendency toward marking. The intersection points of the seams here represent particular weak spots, both in relation to stability as well as in relation to the tendency toward marking.

BRIEF SUMMARY OF THE INVENTION

It is thus an object of the invention to specify a clothing which avoids the mentioned disadvantages of the prior art and in which the base structure is manufacturable in a simpler and more cost-effective manner, on the one hand, and in a manner which is more reliable and of superior quality, on the other hand.

The object in terms of the clothing is achieved by the features described below, and in terms of the method by the steps described below, in each case in combination with the generic features.

It is provided here according to the invention that the clothing is assembled from a plurality of strips which are available in the form of planar formations having a proportion of the base structure and a proportion of the at least one staple-fiber layer, wherein the strips on two mutually opposite edges have seam loops which are in each case connected to seam loops of the edges of adjacent strips, and wherein the edges having the seam loops are oriented in a cross-machine direction of the clothing.

On account thereof, it is possible for an almost unlimited dimensional spectrum in terms of length and width of a clothing to be covered without having to provide comprehensive machinery including wide weaving and needling machines. The clothings produced in this way are thus manufacturable in a very cost-effective way and are moreover tailorable in length and width so as to be suitable for almost any paper, cardboard, or tissue machine.

The method according to the invention for manufacturing a clothing in particular for use in a press section of a machine for manufacturing a fibrous web such as a paper, cardboard, or tissue web, here comprises the following method steps: i) manufacturing a base structure of arbitrary width; ii) converting the base structure to goods in roll form; iii) applying at least one staple-fiber layer and needling the latter to the base structure; iv) tailoring the goods in roll form to form strips; v) rotating the strips by 90°; and vi) connecting the strips (2) to a clothing.

Further advantageous aspects and refinements of the invention may be derived from the dependent claims.

It may be preferably provided that a plurality of staple-fiber layers which have various mass per unit area and/or various fiber thicknesses are provided. On account thereof, the physical properties of the clothing may be adapted to the respective position and the dewatering behavior may be optimized.

The base structure may advantageously be selected from a variety of possibilities: a flat-woven structure having woven seam loops on edges; a flat-woven structure which is unified to form a tube-like endless tape and is placed flat to configure seam loops on the edges of said flat-woven structure; a circular-woven structure, which is placed flat to configure seam loops on the edges thereof; a helically wound structure which is produced by helically winding narrow tapes in an overlapping or butt-jointed manner and is placed flat to configure seam loops at the ends thereof; a helically formed cross-laid yarn structure having a fibrous non-woven, which is placed flat to form seam loops; a helical structure of plastic-material helices which are deposited so as to be mutually engaged and by means of pintles are connected to form a planar formation, wherein edge-bound helices form seam loops.

According to one advantageous embodiment it may be provided that one or a plurality of functional layers is/are disposed on the base structure and/or on the at least one staple-fiber layer and/or between staple-fiber layers and/or as a cover layer on the topmost staple-fiber layer. This enables further improvement and refinement of dewatering, for example in respect of the rewetting properties of the clothing.

The one or a plurality of functional layers may be selected from: films, foils, cross-laid structures, knitted fabrics, warp-knitted fabrics.

Preferably, connecting the strips may be performed by means of pintles through the seam loops or by incorporating a thermoplastic material or an adhesive, in particular a bi-component epoxy or acrylic resin.

According to aspects of the invention, method steps i), ii), iii), and v) may additionally comprise a subsequent heat-setting step, so as to straighten and stabilize the structure.

Method step ii) may comprise the following part-steps: a) closing the lateral seam loops of the base structure by fastening in each case one additional woven-fabric strip; b) rolling up the base structure provided with the additional woven-fabric strip.

Method step iii) may comprise the following part-steps: a) applying one or a plurality of layers of staple fibers having various fiber diameters and mass per unit area to the goods in roll form in one or more steps; b) fixing the staple-fiber layer to the base structure by needling; c) optionally repeating step b).

A needling density of approx. 500 to 1500 stitches per $cm^2$ may preferably be provided, so as to ensure good bonding between the staple-fiber layers and the base structure.

According to one advantageous refinement of the invention it may be provided that method step iii) additionally comprises incorporating one or a plurality of functional layers.

Method step iv) may comprise the following part-steps: a) cutting the goods in roll form so as to correspond to the desired width of the clothing; b) slitting the staple-fiber layers for manufacturing seam flaps on the edges; c) opening the seams between the base structure and the additional woven-fabric strips by removing the pintle; d) separating the strips from one another.

BRIEF DESCRIPTION OF THE SEVERAL
VIEWS OF THE DRAWING

The invention will be described in more detail hereunder by means of preferred exemplary embodiments and without limiting the generality of the invention. In the figures:

FIG. 1 shows a highly schematic view of a clothing which according to the invention is made from individual strips;

FIG. 2 shows a schematic view of an individual strip of the base structure of a clothing configured according to the invention; and FIG. 3 shows a highly schematic cross-sectional view of the base structure which has been tailored as goods in roll form and which has lateral auxiliary strips.

DESCRIPTION OF THE INVENTION

In order for the invention to be better understood, a highly schematic in-principle diagram of a finished clothing 1 which is configured according to the invention is initially illustrated in FIG. 1. It should be noted that for reasons of clarity only one base structure 3 without further additional components is illustrated here.

The clothing 1 here has a plurality of strips 2 which are disposed and interconnected so as to be beside one another in a cross-machine direction (hereunder referred to as CMD). The individual strips 2 are interconnected by seam regions 4.

A single strip 2 of the base structure 3 is illustrated in a schematic view in FIG. 2. The base structure 3 here may be embodied or manufactured in various ways, respectively. On the one hand, a flat-woven structure having woven seam loops 5 on lateral edges 6 is possible. Structures of this type may be manufactured in large widths on established weaving looms.

It is furthermore possible and conceivable for flat-woven structures which have been unified to form a tubular endless tape, or for circular-woven structures to be used, which in both cases have been placed flat so as to configure seam loops 5 on the edges 6 of the former. A circular-woven structure which has subsequently been placed flat is illustrated in an exemplary manner in FIG. 2 here. The structure has mutually intersecting longitudinal yarns 7 and cross yarns 8 which are mutually interwoven in a known manner and form a planar formation. The longitudinal yarns and/or cross yarns 7, 8 here are preferably crumped, which is achievable by way of suitable heat treatment, and on account thereof, are subject to a lower risk of the yarns migrating.

A further possibility lies in likewise placing flat helically wound structures which are produced by helically winding narrow tape goods for example over two mutually spaced-apart rollers in an overlapping or butt-jointed manner, so as to configure seam loops 5 on edges 6. A similar embodiment having a yarn strand and a non-woven which are collectively wound is conceivable. Here, an upper woven fabric of goods in roll form is added. Here too, the wound structure is deposited or placed flat so as to be doubled, respectively.

Helical structures which are composed of plastic-material helices are also a suitable alternative for the base structure 3. Here, the plastic-material helices are deposited beside one another in a mutually engaging manner, and the individual helices are connected by means of pintles 10 so as to form a planar formation. Here, edge-bound helices may in each case serve as seam loops 5. Filler wires from PA may be provided in the helices. The helical structure here is tailored as goods in roll form and such that the helices are oriented in the machine direction of the later finished clothing.

The concept of the clothing 1 configured according to the invention is based on the final press felt to be manufactured from pre-tailored goods in roll form, wherein the goods in roll form are processed to form the abovementioned strips 2 which, accordingly oriented, are then interconnected and finally heat set, as will be described in more detail in the following.

In a first step the base structure 3 is manufactured. As has already been discussed above, the latter may be embodied as a flat or circular woven fabric, a helical structure, or a helically enhanced cross-laid structure. The base structure 3 is placed flat or has already been woven in flat form. Once the base structure 3 has been manufactured in an arbitrary width, a textile web which on two mutually opposite edges 6 has seam loops 5 is available. The edges 6 having the seam loops 5 here are the longer edges of the base structure 3.

The preferred material for the base structure 3 is polyamide; however, other established materials such as PPS, PA, PET, CoPA, inter alia are also possible and conceivable. The longitudinal yarns and cross yarns 7, 8 may be available as monofilaments, multifilaments, or twisted yarns.

If and when required, the laying flat may be followed by a first heat setting, so as to produce a stable base structure 3 and stable seam loops 5.

In the next method step, the preparation of the base structure 3 as goods in roll form is performed. Here, the seam loops 5 of the base structure 3 are initially closed by fastening in each case an additional and narrower woven-fabric strip 9, on account of which the goods in roll form assume the appearance according to FIG. 3.

When viewing FIG. 3 it becomes apparent that the base structure 3 which has been placed or woven in a flat manner is provided with the woven-fabric strip 9 on both sides. The latter are likewise provided with seam loops and serve in facilitating manageability of the entire formation, since the seam loops 5 otherwise might catch on one another when being rolled up, on the one hand, and serve also in protecting the seam loops 5 which otherwise might be damaged by the catching thereof or else in the subsequent needling step, on the other hand. The interconnected woven-fabric strips 9 and the base structure 3 are thereafter rolled up and are ready for the next step.

If and when required, heat setting may also be performed here, so as to ensure a planar base structure 3 for the next method step.

In the next method step, one or a plurality of layers of staple fibers, which may be available having various fiber diameters and mass per unit area, are disposed and fixed to the goods in roll form in one or a plurality of steps. The fibers of the staple-fiber layers here may be selected from PA, PET, PAc, or bi-component materials. Furthermore, the orientation of the fibers in the staple-fiber layers may vary. The fibers are usually oriented in the cross-machine direction of the finished clothing. The orientation may thus not serve for bridging the seam region. However, it may be provided that the fiber orientation is rotated in the machine direction of the finished clothing, so that bridging of the seam region to some extent is possible.

A staple-fiber layer 11 of this type is illustrated in FIG. 3. Since the application and needling of staple-fiber layers to a base structure 3 represents prior art, a detailed description thereof may thus be dispensed with. Only those components which are essential in terms of the method according to the invention will be explained in more detail.

Preferably one staple-fiber layer after the other is separately applied to the base structure. This requires a multiple needling process from one roll to another. After each method step the goods in roll form are conveyed back to the beginning of the needling path, so as to carry out the next needling procedure.

Further layers, for example PU films or PU woven fabrics, may be interlaid between the individual staple-fiber layers.

Alternatively, it is also conceivable for various staple-fiber layers to be initially unified into one layer and for the latter to be applied to the base structure 3 in a single method step and to be needled to the base structure 3 in one single needling process. A needling density of approx. 500 to 1500 stitches per $cm^2$ should be finally achieved, so as to ensure good anchoring of the fibers of the staple-fiber layers in the base structure 3.

For reasons of simplification of the method, always the entire width of the goods in roll form, including the lateral woven-fabric strips 9, is covered with staple-fiber layers and needled here.

It may potentially be necessary in a final step for a further layer, such as for example a further woven fabric, cross-laid structure, warp-knitted fabric, a membrane, or a film, to be applied as a cover layer to the goods in roll form.

Prior to the goods in roll form being subjected to further processing steps, it may be necessary for the goods in roll form to be subjected to heat setting, so as to manufacture a dimensionally stable staple-fiber layer.

In the next method step, converting the goods in roll form into individual strips and assembling the later clothing 1 is performed.

The goods in roll form are cut in a transverse manner to the extent of the edges 6 having the seam loops 5, so as to correspond to the width of the clothing to be produced, while adding an excess for processing. Thereafter, a seam flap is prepared on both edges 6 which are provided with the additional woven-fabric strips 9. The seam flap is created by cutting through the staple-fiber layers down to the base structure 3, wherein care must be taken that the latter as well as the seam loops 5 are not damaged.

The two seams to the additional woven-fabric strips 9 are opened by withdrawing the pintle. The woven-fabric strips 9 are carefully separated from the strip 2.

Thereafter, the strips 2 which now have open seam loops 5 on two edges 6 are rotated by 90° and in the cross-machine direction are connected to the next strip 2. By repeating this step, a clothing 1, in particular a press felt, may be manufactured to any size (length, width). Mutually interconnecting the strips 2 may be performed by way of the usual connection by means of pintles. A thermoplastic material or an adhesive such as a bi-component epoxy or acrylic resin may also be incorporated, so as to produce an adhesive connection in the seam zone. The staple fibers in particular here are fixed to the base structure.

Subsequently, heat setting at a high temperature and tension may in turn be required in order for structural irregularities to be overcome.

The method described is not limited to the manufacture of press felts; other clothings, such as dryer fabric, for example, may also be manufactured in this way.

The invention claimed is:

1. A method for manufacturing a clothing usable in a press section of a machine for manufacturing a fibrous web, paper web, cardboard web or tissue web, the method comprising the following steps:
   i) manufacturing a base structure of any width;
   ii) converting the base structure to goods in roll form;
   iii) applying at least one staple-fiber layer and needling the at least one staple-fiber layer to the base structure;
   iv) tailoring the goods in roll form to form strips;
   v) rotating the strips by 90°; and
   vi) connecting the strips into a clothing.

2. The method according to claim 1, wherein step i) additionally includes a subsequent heat-setting step.

3. The method according to claim 1, wherein step ii) includes the following partial-steps:
   a) closing lateral seam loops of the base structure by fastening one additional woven-fabric strip to each respective lateral seam loop; and
   b) rolling up the base structure provided with the additional woven-fabric strip.

4. The method according to claim 1, wherein step ii) additionally includes a subsequent heat-setting step.

5. The method according to claim 1, wherein step iii) includes the following partial-steps:
   a) applying one or a plurality of layers of staple fibers having various fiber diameters and mass per unit area onto the goods in roll form in one or more steps;
   b) fixing the staple-fiber layer to the base structure by needling; and
   c) optionally repeating step b).

6. The method according to claim 5, which further comprises providing a needling density of approximately 500 to 1500 stitches per $cm^2$.

7. The method according to claim 1, wherein step iii) additionally includes incorporating one or a plurality of functional layers.

8. The method according to claim 1, wherein step iii) additionally includes a subsequent heat-setting step.

9. The method according to claim 3, wherein step iv) includes the following partial-steps:
   a) cutting the goods in roll form so as to correspond to a desired width of the clothing;
   b) slitting the staple-fiber layers for manufacturing seam flaps on edges;
   c) opening seams between the base structure and the additional woven-fabric strips by removing a pintle; and
   d) separating the strips from one another.

10. The method according to claim 1, wherein step v) additionally includes a subsequent heat-setting step.

11. The method according to claim 1, which further comprises incorporating thermoplastic material or an adhesive to create an adhesive connection in a seam zone.

12. The method according to claim 1, which further comprises incorporating a bicomponent epoxy or acrylic resin to create an adhesive connection in a seam zone.

13. A clothing usable in a press section of a machine for manufacturing a fibrous web, paper web, cardboard web or tissue web, the clothing comprising:
   a base structure having any width; and
   at least one staple-fiber layer disposed on said base structure and connected to said base structure by needling;
   said at least one staple-fiber layer and said connected base structure being formed of interconnected strips;
   said strips having two mutually opposite edges and seam loops on said two mutually opposite edges;
   said seam loops each being connected to a seam loop on an edge of a respective adjacent strip; and
   said edges having said seam loops being oriented in a cross-machine direction of the clothing.

14. The clothing according to claim 13, wherein said at least one staple-fiber layer is a plurality of staple-fiber layers having at least one of different mass per unit area or different fiber thicknesses.

15. The clothing according to claim 13, wherein said base structure is selected from the group consisting of:
   a flat-woven structure having edges and woven seam loops on said edges;
   a flat-woven structure having edges, being unified to form an endless tape and being placed flat to configure seam loops on said edges;
   a circular-woven structure having edges and being placed flat to configure seam loops on said edges;
   a helically-wound structure having ends, being produced by helically winding narrow tapes in an overlapping or butt-jointed manner and being placed flat to configure seam loops at said ends;
   a helically-formed cross-laid yarn structure having a fibrous non-woven being placed flat to form seam loops; and
   a helical structure of plastic helices being deposited to be mutually engaged and connected by pintles to form a planar formation with edge-bound helices forming seam loops.

16. The clothing according to claim 13, which further comprises one or a plurality of functional layers disposed at least one of:
   on said base structure or
   on said at least one staple-fiber layer or
   between staple-fiber layers or
   as a cover layer on a topmost staple-fiber layer.

17. The clothing according to claim 16, wherein said one or said plurality of functional layers being selected from the group consisting of films, foils, woven fabrics, cross-laid structures, knitted fabrics, warp-knitted fabrics and non-wovens.

* * * * *